United States Patent
Mao et al.

(10) Patent No.: US 8,098,502 B2
(45) Date of Patent: Jan. 17, 2012

(54) SYSTEM AND METHOD FOR EMISSIONS SUPPRESSION IN A SWITCHED-MODE POWER SUPPLY

(75) Inventors: Ming Ping Mao, Singapore (SG); Yong Siang Teo, Singapore (SG); Siu Kam Eric Kok, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 401 days.

(21) Appl. No.: 12/481,728

(22) Filed: Jun. 10, 2009

(65) Prior Publication Data

US 2010/0315838 A1    Dec. 16, 2010

(51) Int. Cl.
*H02M 3/335* (2006.01)
(52) U.S. Cl. ............ 363/21.03; 363/21.18; 363/97
(58) Field of Classification Search ........... 363/21.02, 363/21.03, 21.1, 21.18, 97
See application file for complete search history.

(56) References Cited

U.S. PATENT DOCUMENTS

| | | | | |
|---|---|---|---|---|
| 5,497,311 A * | 3/1996 | Hanawaka | ............... | 363/21.03 |
| 7,035,122 B2 * | 4/2006 | Kim et al. | ............... | 363/21.18 |
| 2008/0019161 A1 * | 1/2008 | Lee et al. | ............... | 363/89 |
| 2008/0278974 A1 * | 11/2008 | Wu | ............... | 363/21.18 |
| 2010/0296318 A1 * | 11/2010 | Teo | ............... | 363/21.03 |
| 2010/0315838 A1 * | 12/2010 | Mao et al. | ............... | 363/16 |

OTHER PUBLICATIONS

Kleuskens, J., et al., "75W SMPS with TEA1507 Quasi-Resonant Flyback controller," Application Note, Jun. 30, 2000, pp. 1-43, Draft 1 AN00047, Philips Semiconductors.
"GreenChip™ II SMPS control IC," TEA1507, Data Sheet, Dec. 5, 2000, pp. 1-20, Preliminary Specification, Philips Semiconductors.

* cited by examiner

*Primary Examiner* — Jeffrey Sterrett
(74) *Attorney, Agent, or Firm* — Slater & Matsil, L.L.P.

(57) ABSTRACT

In one embodiment, a method of operating a switched-mode power supply that has a switch coupled to a drive signal is disclosed. The method includes deactivating the drive signal at a first instance of time, and comparing a power supply signal to a threshold after deactivating the drive signal. The method further includes activating the drive signal a variable period of time after the power supply signal crosses the threshold.

23 Claims, 8 Drawing Sheets

SYSTEM AND METHOD FOR EMISSIONS SUPPRESSION IN A SWITCHED-MODE POWER SUPPLY

TECHNICAL FIELD

This invention relates generally to power supply circuits, and more particularly to a system and method for reducing emissions in a switched-mode power supply.

BACKGROUND

Switched-mode power supplies are pervasive in the electronics field because of their ability to efficiently convert a first DC or AC voltage to a second regulated output level. Such power supplies are used, for example, in computer power supplies, DC power adapters, and automotive power supplies. As the demand for low power, low cost electronics have increased, however, a corresponding need for lower cost switched-mode power supplies have resulted.

One barrier to more efficient and cost effective switched-mode power supplies has been electromagnetic interference (EMI). High current switching in the tens to hundreds of KHz in a typical switched-mode-power supply has the propensity to create radio-frequency emissions that interfere with communication systems. In consumer and commercial electronics, these emissions are typically regulated by government bodies, for example, the Federal Communications Commission, that regulate and define maximum allowable EMI in particular frequency ranges. One way to reduce emissions is by using conductive shielding around the power supply. With the demand for light weight and inexpensive consumer electronics, adequate shielding is not always technically feasible or cost effective given a particular form factor and/or specification.

Another method of reducing emissions in a switched-mode power supply is to use a flyback converter architecture using a quasi-resonant (QR) controller. A QR controller reduces EMI by activating a switch within the power supply when the voltage across the switch is at a minimum voltage. By keeping the voltage across the switch at a minimum, EMI caused by the instantaneous sourcing or sinking of a large current is minimized.

In systems where the voltage across the switch approaches zero volts, for example, in low input voltage (e.g. Vin=230 Vac) power systems, EMI can be significantly reduced by tuning on the switch when the voltage across the switch is zero voltage. In high input voltage (e.g. Vin=230 Vac) power supply systems, however, the minimum voltage across the switch may still be appreciable during normal operation, which leads to increased EMI.

In the field of switched-mode power supplies, what is needed are cost effective, power efficient, and low EMI systems and methods for switched-mode power supplies.

SUMMARY OF THE INVENTION

In one embodiment, a method of operating a switched-mode power supply that has a switch coupled to a drive signal is disclosed. The method includes deactivating the drive signal at a first instance of time and comparing a power supply signal to a threshold after deactivating the drive signal. The method further includes activating the drive signal a variable period of time after the power supply signal crosses the threshold.

In another embodiment, a circuit for controlling a switched-mode power supply is disclosed. The circuit includes a zero crossing detector configured to compare a primary winding current to a threshold and a variable delay element. The variable delay element has an input coupled to an output of the zero crossing detector, and an output configured to be coupled to a switch in the switched-mode power supply. The variable delay element is configured to propagate a signal from the input of the variable delay element to the output of the variable delay element by a delay that varies with time.

In a further embodiment, a power supply system is disclosed that has a power supply controller integrated circuit (IC). The power supply IC includes a switch drive circuit coupled to a switch driver controller circuit, a sensor coupled to the switch drive circuit, and a variable delay circuit. The switch drive circuit is configured to be coupled to a switch in the power supply system, and the sensor circuit is configured to sense a transient signal within the power supply system and detect when the transient signal crosses a threshold in a region near a local minimum. The variable delay circuit configured to activate the switch drive circuit a time varying time period after the transient signal crosses the threshold.

The foregoing has outlined, rather broadly, features of the present invention. Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present invention will be described with respect to embodiments in a specific context, namely reducing EMI in a switched-mode power supply. Embodiments of this invention may also be applied to other circuits and systems that potentially emit EMI.

Figure 1:
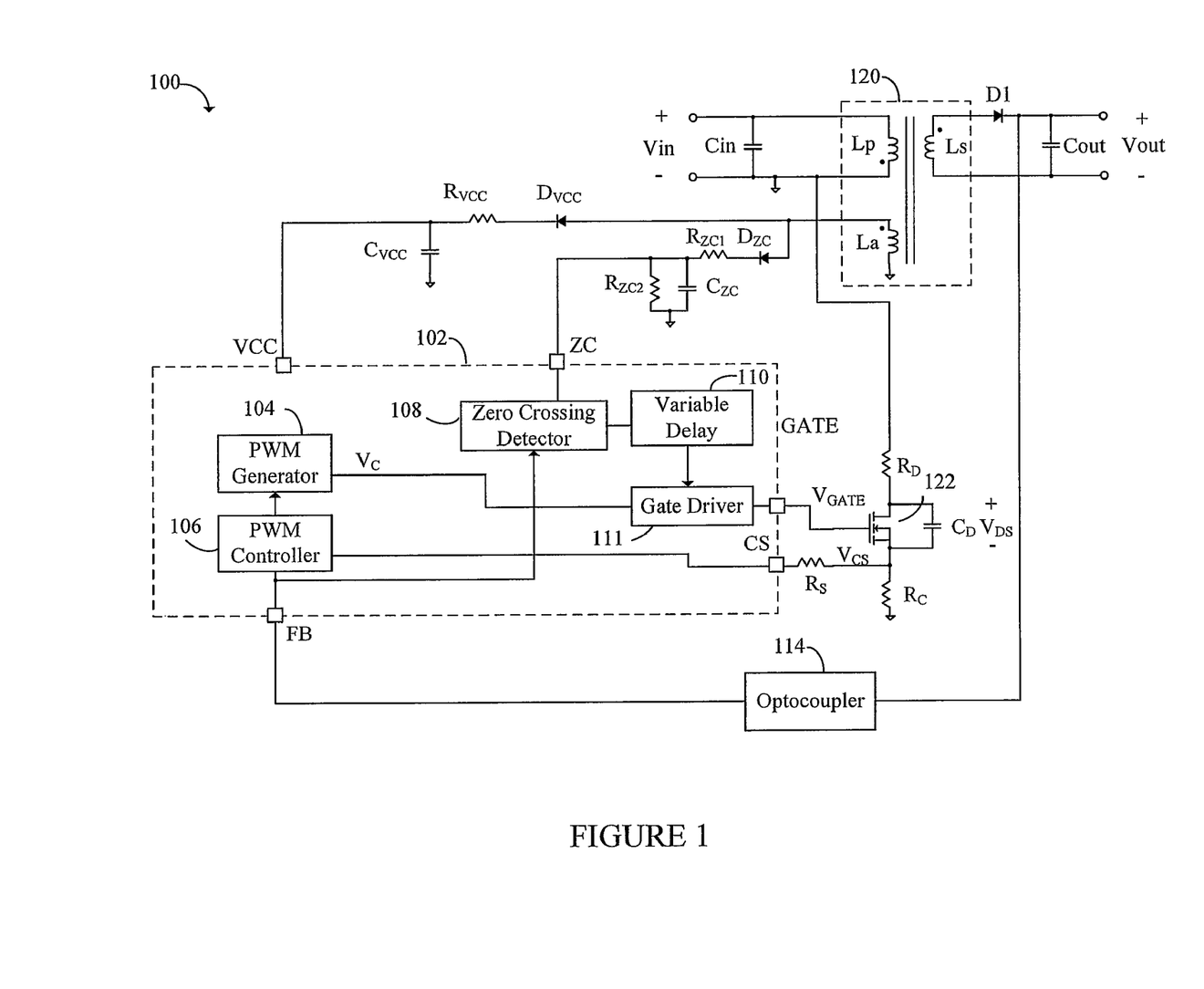
FIG. 1 illustrates a schematic of an embodiment switched-mode power supply.

Switched-mode power supply 100 according to an embodiment of the present invention is illustrated in FIG. 1. Power supply 100 has power supply integrated circuit (IC) 102 containing pulse width modulation (PWM) generator 104, PWM controller 106, zero crossing detector 108 and variable delay 110 and gate driver 111. PWM controller 106 controls PWM generator 104 based on feedback from optocoupler 114.

Power supply 100 converts a first voltage Vin to a DC output voltage Vout. Depending on the system, specifications, and turns ratio of transformer 120, Vin can be greater than, less than, or equal to Vout. In a preferred embodiment of the present invention, Vin is between about 85 Vac and 270 Vac and Vout is between about 3.3V and about 200V. In the embodiment shown in FIG. 1, power supply 100 is implemented as a flyback converter. In alternative embodiments of the present invention, however, power supply 100 can encompass another power supply topology such as a boost, buck, or buck boost converter.

Operation of power supply 100 occurs in two phases. During the first phase, transistor 122 is biased in a conductive state, drawing a linearly increasing current over time from Vin through the primary winding Lp of transformer 120. In the illustrated embodiment, a power MOSFET is used for transistor 122. In alternative embodiments, other device types such as a power BJT or a IGBT can be used. Resistor $R_C$ is used to sense current flowing through primary winding $L_P$. Capacitor Cin filters the input and stores input energy. During the second phase of operation, transistor 122 is shut-off, thereby inducing a voltage on the secondary winding, Ls of transformer 120. Diode D1 rectifies the output, which is filtered by output capacitor Cout.

Auxiliary winding La is also coupled to the magnetic core of transformer 120. Auxiliary winding La is used to couple energy from primary winding Lp to provide power to power supply IC 102, and to provide a primary current measurement input for power supply IC 120. Induced current from auxiliary winding La is rectified by diode $D_{VCC}$ and filtered by $R_{VCC}$ and $C_{VCC}$. $R_{VCC}$ is used to limit the current to Vcc of IC 102 and $C_{VCC}$ is used to hold the voltage for Vcc of IC 102. Capacitor $C_{VCC}$ is preferably coupled to the supply input of power supply IC 102. In alternative embodiments of the present invention, power supply IC 102 can be supplied by a power bus separate from the switched-mode power supply.

Auxiliary winding La further provides a voltage proportional to the voltage in primary winding Lp. La is further coupled to diode $D_{ZC}$, $R_{ZC1}$, $R_{ZC2}$ and $C_{ZC}$ to provide signal ZC to power supply IC 102. Diode $D_{ZC}$ prevents input ZC from attaining a negative voltage, $R_{ZC1}$ and $R_{ZC2}$ form a voltage divider, and $C_{ZC}$ holds the voltage at ZC when $D_{ZC}$ is not conducting. The signal at ZC is used to provide a signal proportional to the drain voltage of transistor 122 for power supply IC to assist in the determination of switch timing, as is explained hereinbelow.

Figure 2:
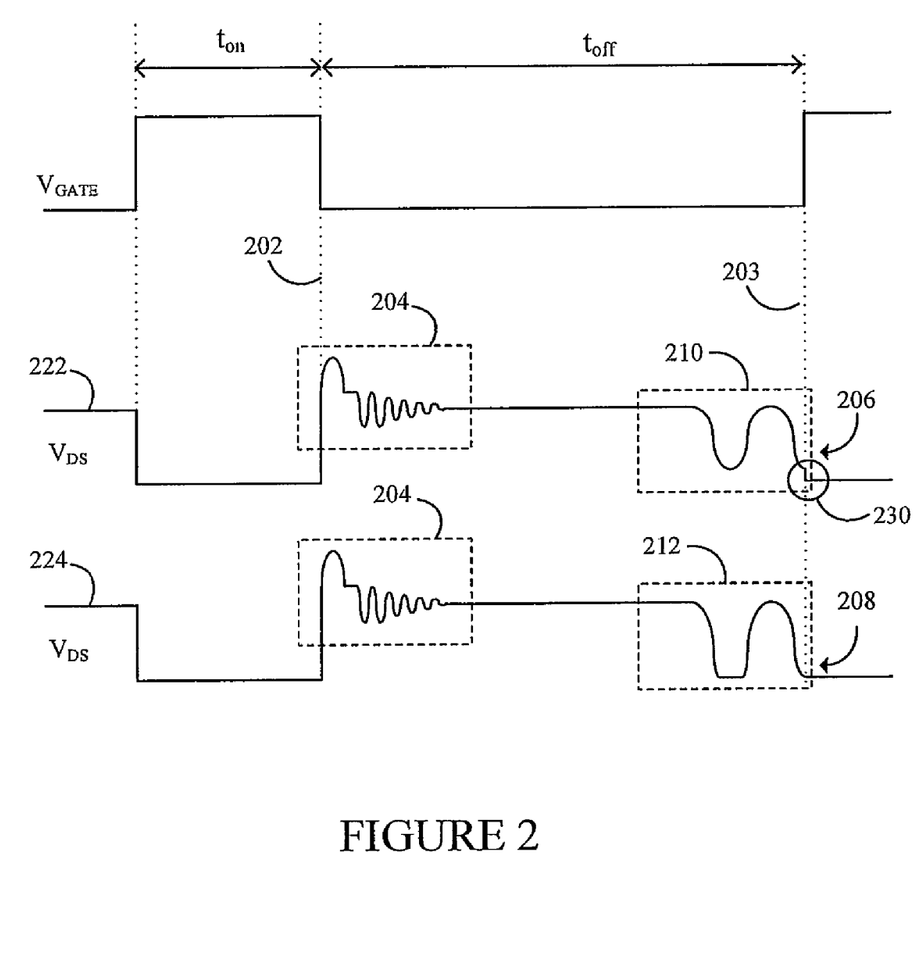
FIG. 2 illustrates a waveform diagram of signals of a switched-mode power supply according to a conventional switching scheme.

FIG. 2 illustrates a waveform diagram of the gate drive voltage at $V_{GATE}$, and $V_{DS}$ of transistor 122 according to a conventional switching scheme. Waveform 222 illustrates the behavior of $V_{DS}$ under high input voltage (e.g. Vin=230 Vac) conditions, and waveform 224 illustrates $V_{DS}$ under low input voltage (e.g. Vin=100 Vac) conditions. During time interval $t_{on}$, $V_{GATE}$ exceeds the turn on threshold for transistor 122, $V_{DS}$ is about 0 V. At edge 202, $V_{GATE}$, is brought low, thereby shutting off transistor 122. When transistor 122 shuts off, the voltage at $V_{DS}$, increases and experiences an underdamped ringing response 204 due to a resonant LC circuit made primarily of the parasitic inductance of transformer 120, and parasitic drain capacitance $C_D$ of MOSFET 122. Resistance Alternative embodiments using other device types for transistor 122 can have a different time domain behavior. For example, ringing response 204 can have a different amplitude envelope or frequency than is shown FIG. 2 or is described herein.

After ringing response 204 has died down, $V_{DS}$ experiences a ringing response 210 and 212 due to primary inductance Lp and the output capacitance of MOSFET 122. Under low input voltage conditions, as shown in waveform 224, $V_{DS}$ is clamped to about zero volts due to the small difference between the input voltage and the reflected voltage. Under high input voltage conditions, as shown in waveform 222, $V_{DS}$ remains greater than zero volts, up to about 230 V.

Compared to a conventional fixed frequency flyback converter, lower EMI is achieved by using a QR flyback converter due to valley switching. In conventional QR flyback converters, the power MOSFET is turned on at the lowest point of the valley of the drain voltage, for example at edge 203 corresponding to points 206 and 208 in waveforms 222 and 224 respectively. By switching the MOSFET when the drain-source voltage is at a minimum, the conducted EMI will be lower because the voltage change at the drain of the power MOSFET is lower.

However this reduction of EMI is insufficient for some applications such as power adapters with a high power output, for example with 150 W output. High output power adapters typically require a high switching frequency to accommodate a small and compact transformer. As is apparent by waveform 222, $V_{DS}$ is greater than zero when $V_{DS}$ reaches a minimum value. When the MOSFET is switched on, current is conducted as $V_{DS}$ is pulled to a lower voltage, which causes voltage step 230. More EMI is generated when $V_{DS}$ is greater than zero at the switching point. This increased EMI is manifested by increased spurious emission at harmonics of the switching frequency. At higher output loads, this increased EMI may occur at higher frequencies if a higher frequency switching is used to increase power output.

Figure 3:
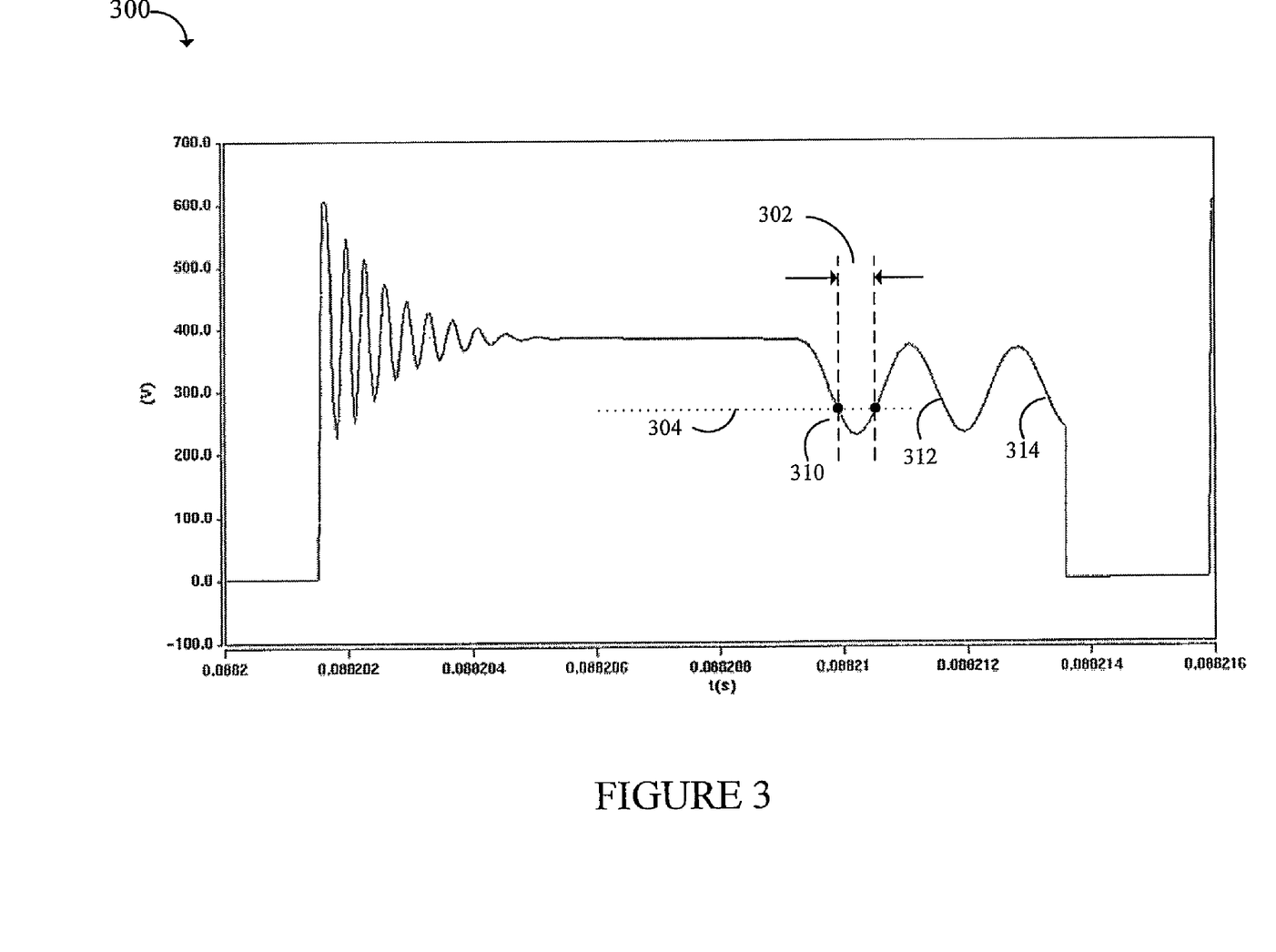
FIG. 3 illustrates a waveform diagram of an embodiment switched-mode-power supply.

FIG. 3 illustrates a waveform diagram of $V_{DS}$ with respect to time for an embodiment of the present invention. In embodiments of the present invention, instead of turning on the MOSFET when the $V_{DS}$ reaches its minimum value, the time at which the MOSFET is turned on is varied or jittered during time interval 302. Time interval 302 can be determined as the time during which $V_{DS}$ is less than a threshold voltage 304. By jittering the turn on time of the MOSFET, peak spurious emissions are spread out over a range of frequencies rather than concentrated at a single frequency. In some embodiments of the present invention, the position of the switch turn-on time within time period 302 can be distributed uniformly and vary periodically. In other embodiments, the position of the switch turn-on time within time period 302 can vary randomly or aperiodically and/or may have a non-uniform distribution over time.

Figure 4:
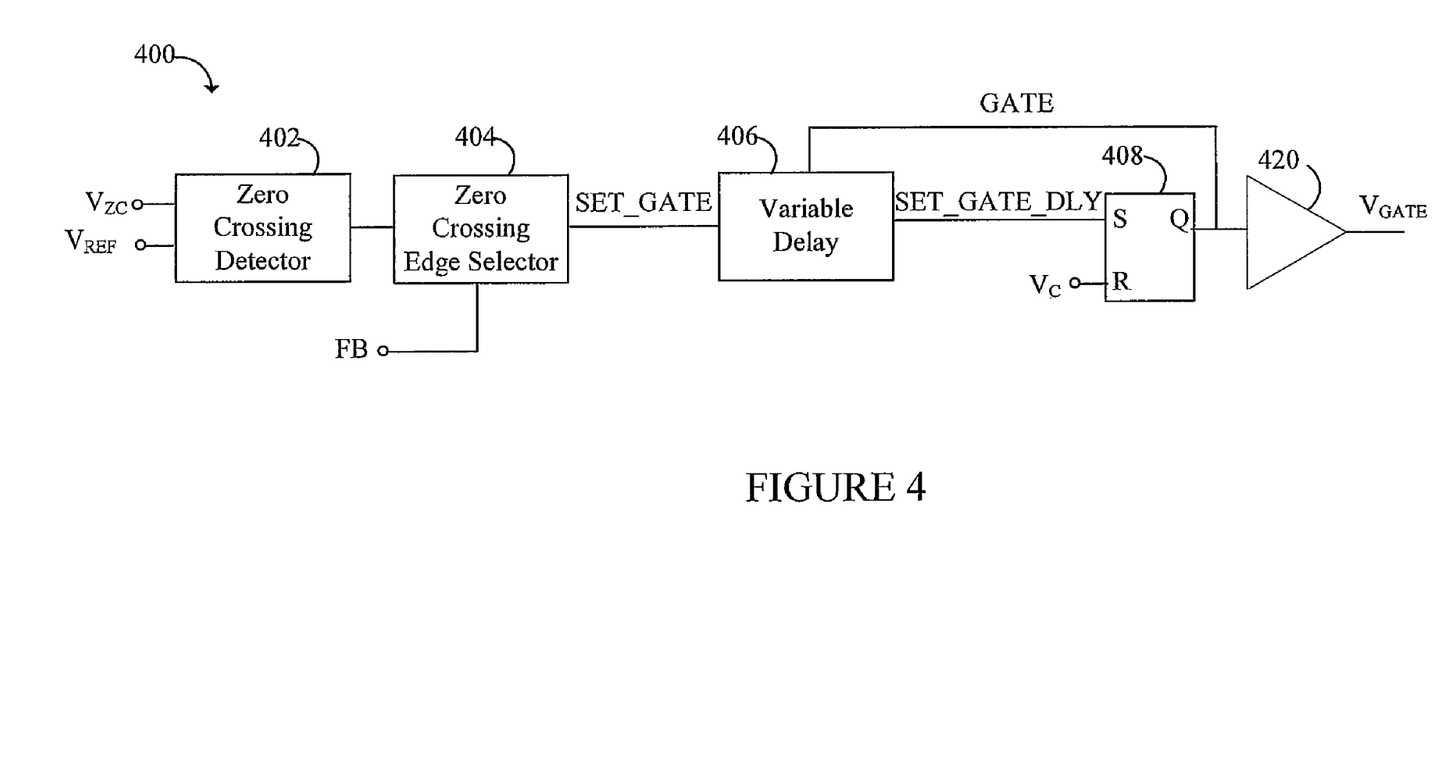
FIG. 4 illustrates an embodiment gate control circuit.

FIG. 4 illustrates a block diagram of a gate control circuit 400 according to an embodiment of the present invention. Gate control circuit 400 has zero crossing detector 402, zero crossing edge selector 404, variable delay block 406 and SR latch 408. Zero crossing detector 402 compares $V_{ZC}$, which is coupled to zero crossing input ZC (FIG. 1) with reference voltage $V_{REF}$. Zero crossing detector 402 has a voltage comparator (not shown) and is designed according to conventional techniques known in the art. In an embodiment of the present invention, $V_{REF}$ is between about 50 mV and about 200 mV. In alternative embodiments, other voltages can be used depending on the specification and architecture of the switched-mode power supply. Once the $V_{ZC}$ crosses the threshold at its falling edge, a pulse is generated.

Zero crossing edge selector 404 receives the output of zero crossing detector 402 and selects which edge to pass onto variable delay element 406. For example, FIG. 3 illustrates three local minima 310, 312 and 314 in waveform diagram 300. Zero crossing edge selector 404 is designed according to techniques known in the art and typically has a counter (not shown) that is incremented each time that it receives a pulse from zero crossing detector 402. Once the zero crossing edge selector 404 reaches a terminal count, output SET_GATE of zero crossing detector 402 changes state. In embodiments of the present invention, the terminal count is dependent on feedback signal FB (FIG. 1). For example, if feedback signal FB is indicative of a heavy load on the power supply, a lower terminal count would be used than if feedback signal FB is indicative of a light load. In alternative embodiments of the present invention, Zero crossing edge selector 404 can be omitted.

In embodiments of the present invention, variable delay block 406 delays the rising edge of input SET_GATE to produce signal SET_GATE_DLY by a time varying time delay. Signal GATE is used to reset variable delay element 406 once the output of latch 408 goes high, which signifies that the power supply switch has been activated. The variable time delay is preferably periodic, but can be aperiodic or random in alternative embodiments of the present invention. In preferred embodiments of the present invention, the variable delay ranges from 60 ns to 800 ns periodically in a period of 4 ms.

Latch 408 is set by signal SET_GATE_DELAY and reset by output $V_C$ of PWM generator 104 (FIG. 1). Output of latch 408 is input to gate driver buffer 420, which provides an interface to the transistor 122 (FIG. 1). In alternative embodiments of the present invention, the input and output polarities of blocks 402, 404, 406, 408 and 420 may be different with respect to absolute polarities, as wells as rising v. falling edge activation. For example zero crossing detector 402 can output a pulse on a rising edge of $V_{ZC}$, and/or latch 408 can be configured to output an inverted signal for applications that have a PMOS (or active low) switch in the switched-mode power supply.

Figure 5:
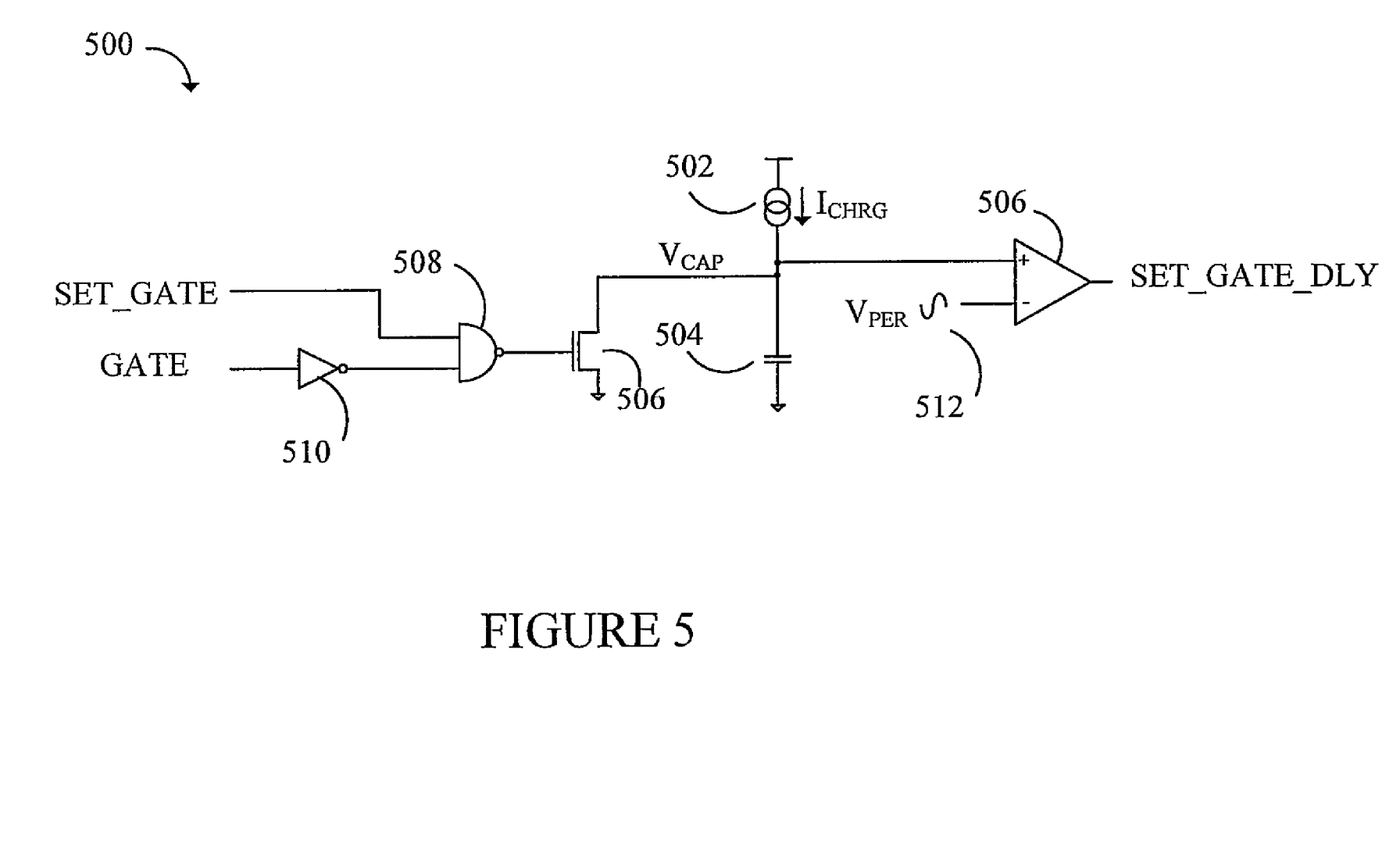
FIG. 5 illustrates an embodiment variable delay circuit.

FIG. 5 illustrates an embodiment variable delay element 500. Input signal SET_GATE is coupled to a first input of NAND gate 508. Signal GATE, which is used to reset variable delay element 500 is inverted via inverter 510 and input to the second input of NAND gate 508. The output of NAND gate 508 is coupled to the gate of NMOS device 506, the drain of which is coupled to capacitor 504. Current source 502 charges capacitor 504 with current $I_{CHRG}$. Capacitor 504 is coupled to comparator 506, which compares voltage VCAP with time varying voltage $V_{PER}$. SET_GATE_DLY forms the output of comparator 506. In alternative embodiments of the present invention, different logic can be used for gates 508 and 510, NMOS device 506 can be implemented by a different device polarity such as a PMOS device, or a different device technology, such as a bipolar device. Furthermore, different polarities can be used for the components illustrated in FIG. 5.

In embodiments of the present invention, variable delay element 500 is activated when signal SET_GATE goes low. When SET_GATE goes low, NMOS device 506 shuts off and capacitor 504 begins to charge up. Once voltage VCAP exceeds $V_{PER}$, output SET_GATE_DLY goes high and sets latch 408 (see FIG. 4). Time varying voltage $V_{PER}$ is preferably a sawtooth waveform with a period of between about 2 ms and 10 ms, preferably 4 ms, and an amplitude of about 4 V peak. $V_{PER}$ is generated according to conventional techniques known in the art. In alternative embodiments of the present invention, other voltage and time period ranges for time varying voltage $V_{PER}$. It should further be appreciated that other circuits and techniques can be used to generate a time varying delay. For example the time variable delay can be implemented digitally.

Figure 6:
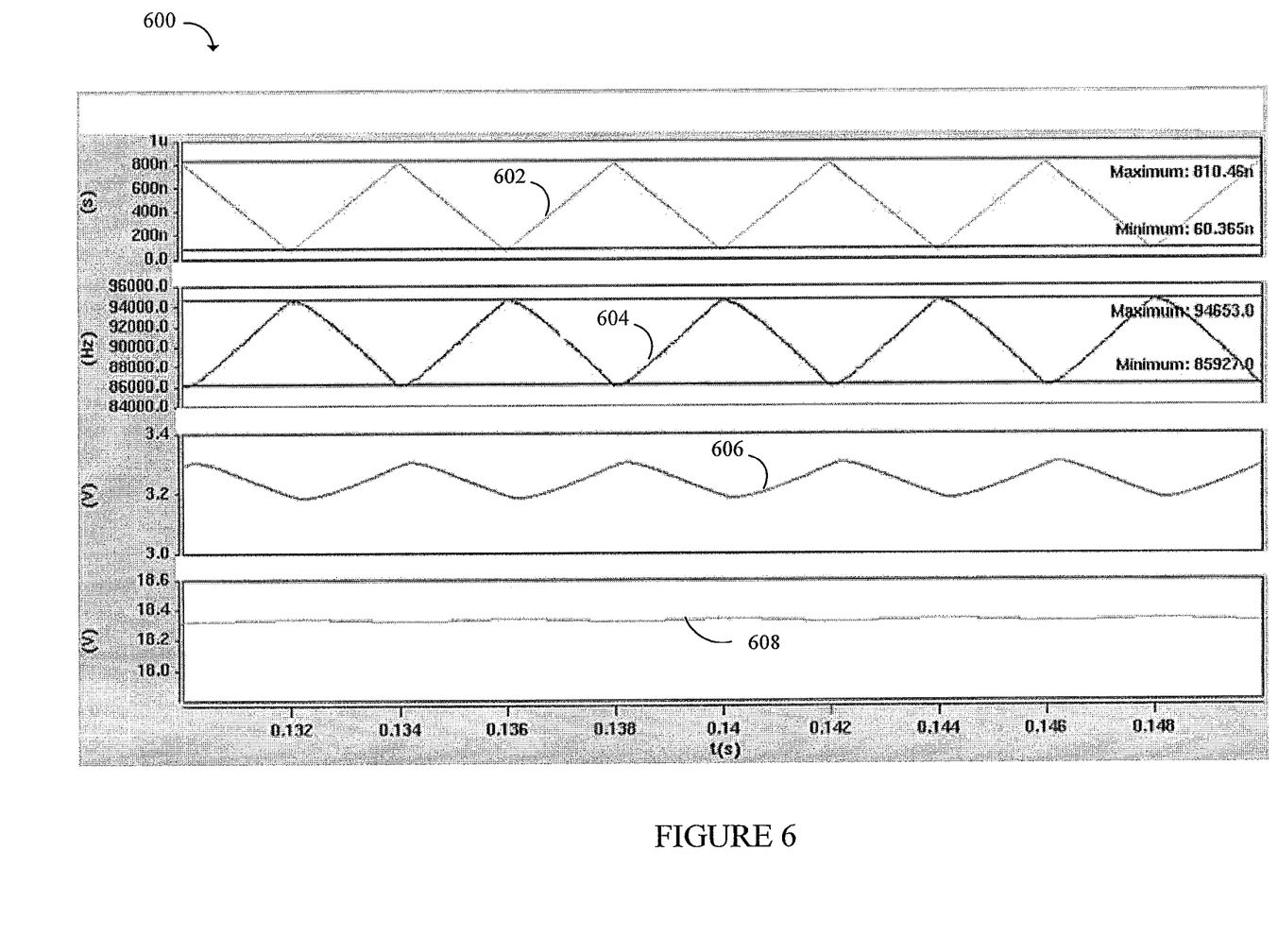
FIG. 6 illustrates embodiment waveform diagrams of an embodiment switched-mode power supply.

Turning to FIG. 6, a waveform diagram 600 of switched-mode power supply system incorporating embodiment techniques is illustrated. Waveform 602 represents the delay of the variable delay element vs time, waveform 604 represents the switching frequency of the switched-mode power supply vs time, waveform 606 represents feedback voltage FB vs time, and waveform 608 represents output voltage Vout vs time. It can be seen that the effect of the variable delay element is to periodically jitter the switching frequency of switched-mode power converter.

Figure 7A:
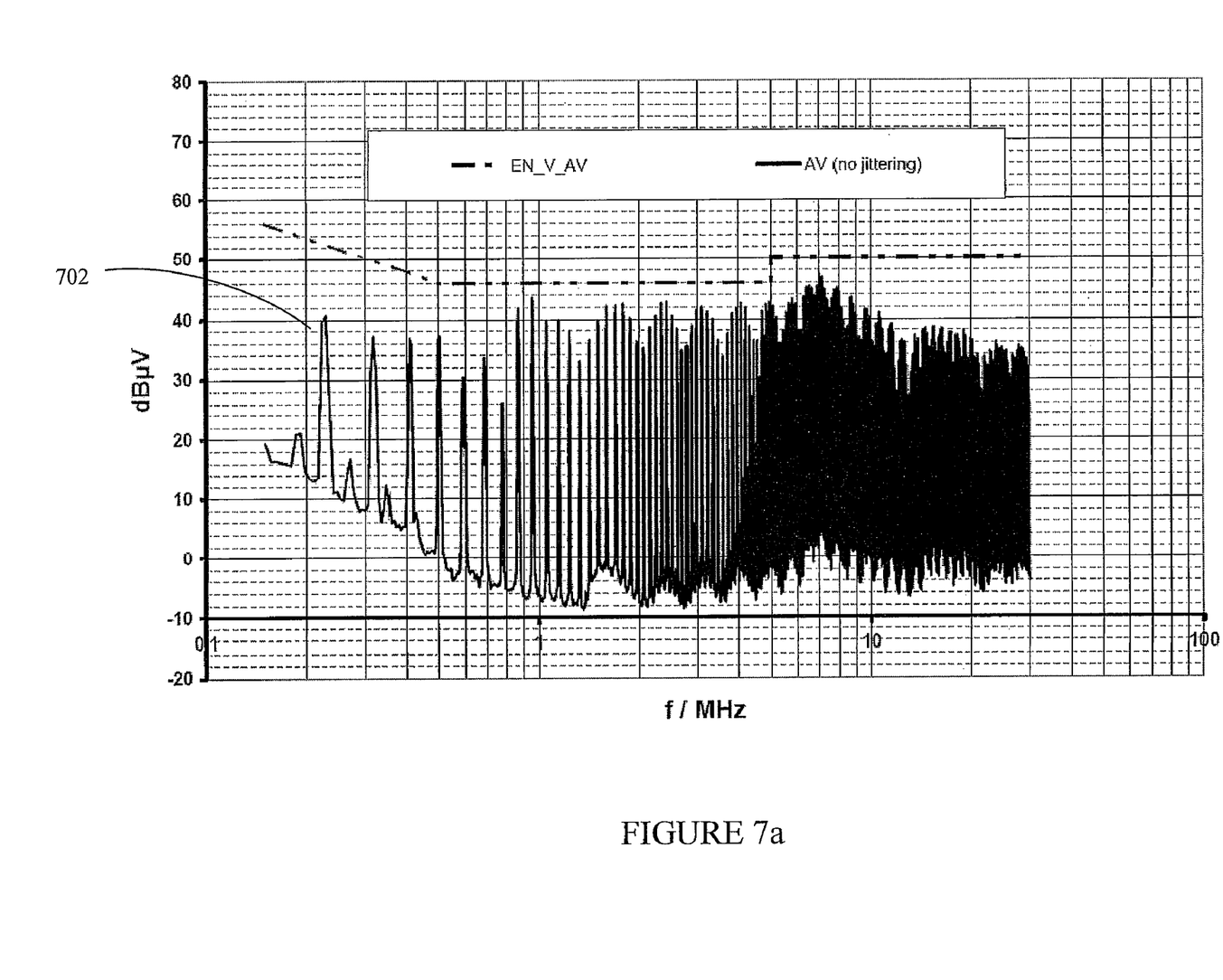
FIGS. 7*a* and 7*b* illustrate an embodiment waveform diagram comparing an embodiment EMI spectrum with a conventional EMI spectrum.
Figure 7B:
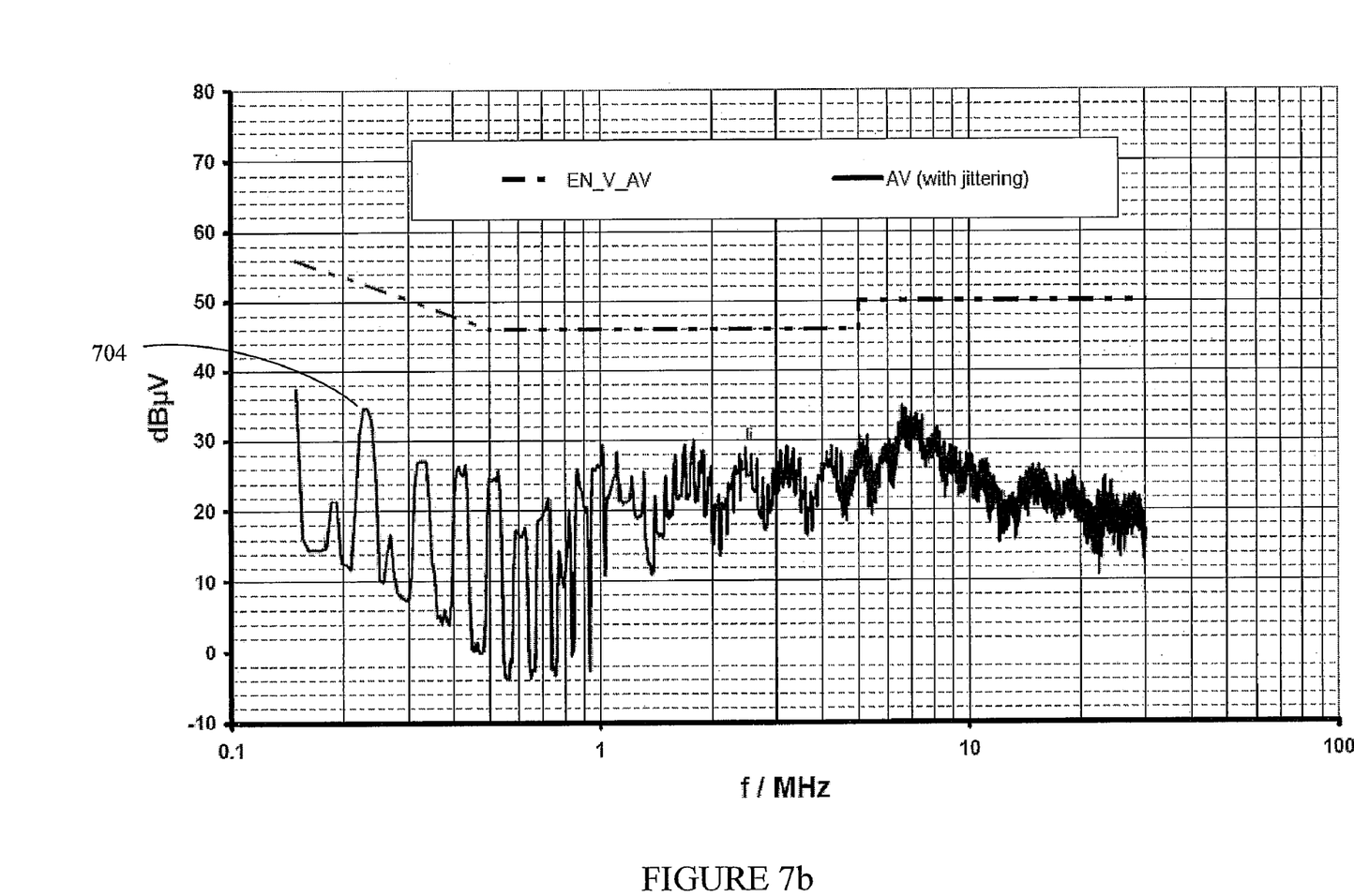

FIGS. 7a and 7b illustrate waveform diagrams that compare EMI spectrum 704 (FIG. 7b) of an embodiment switched-mode power supply with an EMI spectrum 702 (FIG. 7a) of a non-embodiment switched-mode power supply. Embodiment EMI spectrum 704 is about 10 dB lower than conventional EMI spectrum 702. Frequency jitter of embodiment power supplies spreads out the spurious harmonics of the power supply switching frequency, and therefore reduces the EMI emitted by the power supply. Alternative embodiments of the present invention may have different EMI spectrums, and improvements offered by alternative embodiments may show a greater or less improvement than is shown by the waveform diagrams.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A method of operating a switched-mode power supply comprising a switch coupled to a drive signal, the method comprising:
   deactivating the drive signal at a first instance of time;
   after deactivating the drive signal, comparing a power supply signal to a threshold; and
   activating the drive signal a variable period of time after the power supply signal crosses the threshold.

2. The method of claim 1, wherein the power supply signal is proportional to a voltage signal in a primary winding of the switched-mode power supply.

3. The method of claim 2, wherein the activating the drive signal comprises activating the drive signal a variable period of time after the power supply signal crosses the threshold a number of times.

4. The method of claim 1, wherein the variable time comprises a time delay that varies as a random function of time.

5. The method of claim 1, wherein the variable time comprises a time delay that varies as a periodic function of time.

6. The method of claim 1, wherein:
activating the drive signal a variable period of time comprises generating a variable delay; and
generating the variable delay comprises
charging or discharging a capacitor,
comparing a voltage on the capacitor to a periodically varying reference voltage, and
turning on the drive signal when the voltage on the capacitor crosses the periodically varying reference signal.

7. The method of claim 6, further comprising resetting the voltage on the capacitor.

8. The method of claim 1, wherein activating the drive signal comprises turning on the switch.

9. The method of claim 8, wherein the switch comprises a MOSFET.

10. A circuit for controlling a switched-mode power supply, the circuit comprising:
a zero crossing detector configured to compare a primary winding voltage to a threshold; and
a variable delay element comprising
an input coupled to an output of the zero crossing detector, and
an output configured to be coupled to a switch in the switched-mode power supply, wherein the variable delay element is configured to propagate a signal from the input of the variable delay element to the output of the variable delay element by a delay that varies with time.

11. The circuit of claim 10, further comprising:
a latch comprising a first input coupled to the output of the variable delay element, the latch comprising an output configured to be coupled to the switch in the switched-mode power supply; and
a pulse width modulator circuit comprising an output coupled to a second input of the latch, and an input configured to be coupled to a feedback node of the switched-mode power supply.

12. The circuit of claim 10, wherein the variable delay element comprises:
a discharge switch comprising a control node coupled to the input of the variable delay element, the control node configured to activate the discharge switch;
a capacitor coupled to the switch and to a current source, wherein the discharge switch is configured to discharge the capacitor when the discharge switch is activated, and the current source is configured to charge the capacitor; and
a comparator comprising
a measuring input coupled to the capacitor,
a reference input coupled to a time-varying voltage, and
an output coupled to the output of the variable delay element.

13. The circuit of claim 12, wherein the variable delay element further comprises a logic circuit coupled between the input of the variable delay element and the control node, wherein the logic circuit is configured to activate the switch.

14. The circuit of claim 12, wherein the discharge switch comprises a transistor.

15. The circuit of claim 14, wherein the transistor comprises a MOS transistor.

16. The circuit of claim 12, wherein the time varying voltage comprises a periodic voltage.

17. The circuit of claim 16, wherein the periodic voltage comprises a sawtooth wave.

18. A power supply system comprising the circuit of claim 10.

19. A semiconductor circuit comprising the circuit of claim 10.

20. The circuit of claim 10, wherein the circuit is configured to drive a MOSFET in the switched-mode power supply.

21. A power supply system comprising:
a power supply controller integrated circuit (IC), the power supply controller IC comprising:
a switch drive circuit coupled to a switch driver controller circuit, wherein the switch drive circuit is configured to be coupled to a switch in the power supply system, and
a sensor circuit coupled to the switch drive circuit, the sensor circuit configured to sense a transient signal within the power supply system and detect when the transient signal crosses a threshold in a region near a local minimum; and
a variable delay circuit configured to activate the switch drive circuit a time varying time period after the transient signal crosses the threshold.

22. The power supply system of claim 21, wherein
the transient signal is proportional to a primary winding voltage; and
the power supply controller IC comprises a quasi-resonant controller.

23. The power supply system of claim 21, wherein the time varying time period comprises a periodically varying time period.

* * * * *